Figure 1:
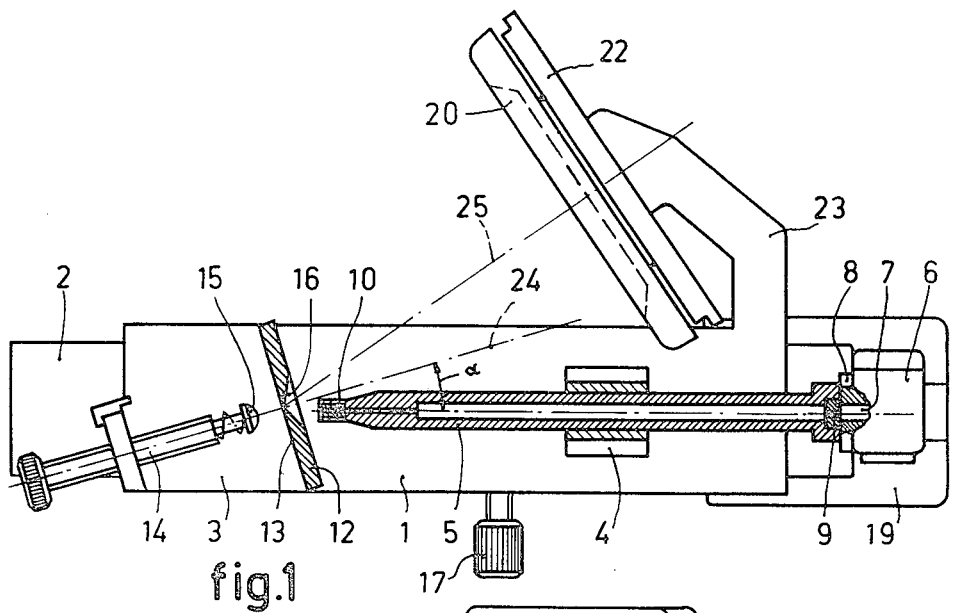

United States Patent
Eckerlin

[15] 3,649,831
[45] Mar. 14, 1972

[54] DEVICE FOR DETERMINING THE CRYSTALLOGRAPHIC DIRECTIONS IN SINGLE CRYSTALS BY X-RAYS

[72] Inventor: Peter Eckerlin, Aachen, Germany
[73] Assignee: U. S. Philips Corporation, New York, N.Y.
[22] Filed: June 23, 1969
[21] Appl. No.: 835,611

[30] Foreign Application Priority Data

June 22, 1968 Germany.....................P 17 72 706.9

[52] U.S. Cl..............................................250/51.5, 250/53
[51] Int. Cl. ....................................................G01n 23/20
[58] Field of Search..........................................250/51.5, 53

[56] References Cited

UNITED STATES PATENTS 2,500,948   3/1950   Kaiser et al............................250/51.5

Primary Examiner—James W. Lawrence
Assistant Examiner—A. L. Birch
Attorney—Frank R. Trifari

[57] ABSTRACT

A device for determining the crystallographic directions in single crystals comprises a holder for a single crystal, a source of primary X-rays, e.g., an X-ray tube, and a recording surface for receiving and recording X-rays reflected by the lattice planes of the crystal, e.g., diffracted X-rays. In order to increase the accuracy of the measurement, the crystal is ground to provide a reference surface the normal of which is inclined at a small angle relative to the path of the beam of primary X-rays which are incident thereon. The film for receiving and registering the reflected X-rays from the lattice planes of the crystal is located to one side of the path of the primary X-ray beam and is so positioned that the normal to the surface of the film is rotated relative to the primary X-ray beam by twice the angle between the normal to the smooth surface of the crystal and the central ray of the primary X-ray beam.

Preferably, the crystal is mounted in a holder which with the film are arranged on a common base plate.

4 Claims, 2 Drawing Figures

PATENTED MAR 14 1972

3,649,831

INVENTOR.
PETER ECKERLIN
BY
AGENT

ND3,649,831

DEVICE FOR DETERMINING THE CRYSTALLOGRAPHIC DIRECTIONS IN SINGLE CRYSTALS BY X-RAYS

The invention relates to a device for determining the crystallographic directions in single crystals relative to an available flat surface by means of X-rays. This surface is provided by mechanical processing approximately parallel to a predetermined lattice plane of low index and will be termed hereinafter the reference surface. Its position can be adjusted by simple means for coarse setting with an accuracy of about 1° parallel to the preferential plane. This accuracy is usually not sufficient and there has been proposed a Laue reflection method which permits in routine operation determining considerably smaller discrepancies. Reflections produced by incident X-rays are registered on a photographic plate.

The purpose is to find the accurate positions of the two normals that of the lattice plane and that of the reference plane relative to each other. Two graphs are made on the same film, the crystal being turned in the first graph through 180° about the normal to the reference plane so that in the case where the reference plane and the lattice plane are not parallel the latter will swing and identical reflections on the graph are separated. The position of the reflections is determined by the angle of swinging and the position relative to the crystal or by corresponding components of the angle of swinging relative to definite crystal marks.

Basically the Laue reflection method is involved here in which the film is arranged at right angles to the central ray of the X-ray beam, the X-ray penetrating through an opening of the film, while the crystal is adjusted by its reference surface to the X-rays. This surface is not at right angles to the X-ray beam, but it is slightly inclined so that the normal to the surface at the spot of incidence of the X-rays deviates from the normal and is directed approximately to a spot midway between the edge and the opening for the primary ray in the photographic film. Therefore, even with a slight deviation of the desired lattice plane relative to the reference surface the reflections of the lattice plane cannot fall into the primary ray opening.

In this method of measurement the localisation of the target point of the normal to the surface on the film is dispensed with, because this point can never be reproduced with full accuracy. By turning the crystal through 180° about its normal to the surface and by a subsequent further exposure of the film, reflections of the desired lattice plane are obtained, which are separated by four times the angle of rotation and are located substantially symmetrically with respect to the point of impact of the surface normal in the target plane of the X-rays.

The accuracy of the measurement is related particularly to the correct determination of the distance of the reflections on the film and the distance between film and crystal, and from measured results obtained the deviation of the normal to the lattice plane from the normal to the reference surface can be calculated. An arrangement which is particularly advantageous is that in which the position of the reference surface of the crystal relative to the photographic film can be accurately determined. The known arrangement involves the difficulty that the normal to the reference surface is obliquely incident to the film so that a deformation of the diffraction image disturbing the measurement has to be taken into account. Moreover, the thus far unavoidable scattering of the primary rays on the film has a slightly disturbing background effect in the range of the reflection positions deviating comparatively slightly from the central ray of the X-ray beam.

The invention has for its object to avoid these disadvantages in a device of the kind set forth having a target crystal surface to be examined inclined to the primary X-rays. According to the invention the registering surface i.e., the film for the X-rays reflected by the lattice planes of the crystal to be examined is located adjacent the path of the primary rays, while this registering surface occupies a position in which the normal to the surface is rotated relative to the primary X-ray beam by twice the angle between the normal to the smooth surface of the crystal and the central ray of the primary X-ray beam. Preferably the film and crystal holders are arranged on a common base plate so that the distance of the film from the reference plane can be adjusted and definitely mixed. The distance between film and reference plane can then be accurately determined by means of a single calibrating graph with the aid of a cubic single crystal by using reflections from symmetrical lattice planes whose angle is accurately known as a result of the cubic symmetry.

The drawing shows details of the device according to the invention, in which

Figure 2:
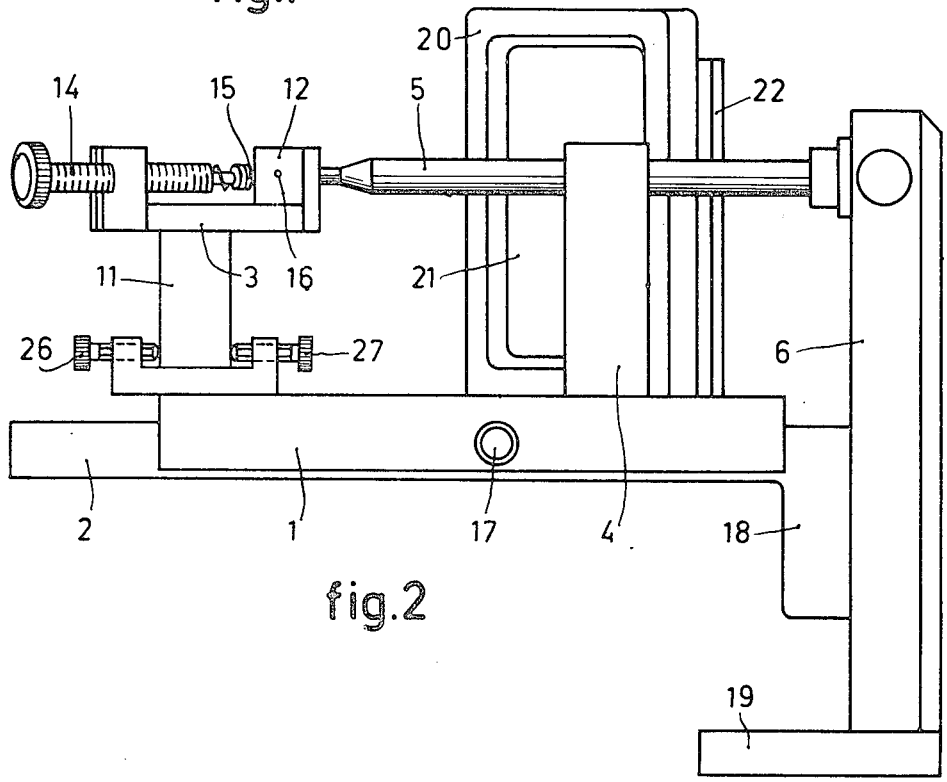

FIG. 1 is an elevation and
FIG. 2 is a side elevation.

A base plate 1, which is slidable along a support 2, is provided with a crystal holder 3 and a holder 4 for the collimator 5 of the X-ray beam to be used for the examination. The X-ray beam emanates from an X-ray tube (not shown), arranged in a supporting column 6 and passes through an exit opening 7 in the wall 8 of the column 6 into the collimator 5. The entrance opening 9 of the collimator 5 has a size of 1 to 1.5 mm. and the end is constructed so that all stray rays are withheld. The exit opening 10 has a size of about 0.3 mm.

The crystal holder 3 is arranged on a support 11 on the base plate 1 and has a flat surface 12 of ground stainless noble steel. The slide 13 remote from the X-ray incidence is the counterface for the reference surface by which a crystal is urged against the surface 13 by means of a screw 14 via a head 15 resiliently held therein. The plate 12 has a conical opening 16, through which the X-rays can strike the crystal and the reflections can emanate.

By means of a screw 17 the base plate 1 can be fixed to the support 2, which is fastened by an angle-section arm 18 to the column 6. The latter is held by a base 19.

The rays reflected from the crystal are captured by a film 21 in a film cassette 20, which may be a conventional flat cassette. It is fastened to a rear wall 22, which is held by an arm 23 on the base plate.

In order to determine by this device the deviations of the normal to ground, smooth surfaces of single crystals from the normal to the lattice plane, the crystal is clamped in a position well defined with respect to its external shape. The flat ground surface 13 of the crystal holder plate 12 is turned relatively to the main direction of the beam, that is to say the normal to the surface 24 is inclined to the X-ray beam by an angle $\alpha$, which allows the film 21 to be disposed at the side of the X-ray collimator 5 for capturing the resultant reflections. In order to ensure a minimum deformation of the diffraction image, the film 21 is turned through an angle $2\alpha$ between the normal 25 to the film and the X-ray.

This disposition guarantees a great accuracy of the measurements, which in a measuring range from 4' to 6' without optical expedients is about 2' and in a measuring range from 2' to 3° can be reduced to about 1'.

The distance between the film and the reference surface is adjustable over a restricted length by means of the screws 26 and 27, between which the support 11 of the crystal holder 3 is clamped so that this distance can be accurately adjusted and fixed definitely.

What is claimed is:
1. In a device for determining the crystallographic directions in single crystals by a primary beam of X-rays relative to a smooth surface on the crystal, in which X-rays reflected from the crystal are registered on a photographic plate, and the smooth surface of the crystal is inclined to the central ray of the primary X-ray beam, the improvement wherein the recording surface for the X-rays reflected by the crystal is located adjacent the path of the primary rays in a position in which a normal to the recording surface is turned through twice the angle between the normal to the smooth surface of the crystal and the central ray of the primary X-ray beam.

2. A device as claimed in claim 1, wherein a holder for the recording surface and a holder for the crystal are arranged on a common base plate.

3. A device as claimed in claim 2, wherein the holder for the crystal is adjustable in the direction of the X-rays.

4. A device for determining the crystallographic directions in a single crystal comprising means to generate a beam of primary X-rays, means to position the single crystal with a given reference surface the normal to which forms a given angle with the central ray of the primary X-ray beam incident thereon, a detector for receiving and recording X-rays reflected by given lattice planes of the crystal, said detector being positioned adjacent the path of the primary X-ray beam and having a given receiving surface on which the reflected X-rays are incident, said detector receiving surface having a normal which forms an angle with the central ray of said primary X-ray beam which is twice that formed between the normal to the crystal reference surface and the primary X-ray beam.

* * * * *